(12) United States Patent
Wakileh et al.

(10) Patent No.: US 12,130,478 B1
(45) Date of Patent: Oct. 29, 2024

(54) PASSIVE AND ACTIVE FIBER CONNECTIVITY MODULE

(71) Applicants: George Wakileh, Batavia, IL (US); Alexander George Wakileh, Batavia, IL (US)

(72) Inventors: George Wakileh, Batavia, IL (US); Alexander George Wakileh, Batavia, IL (US)

(*) Notice: Subject to any disclaimer, the term of this patent is extended or adjusted under 35 U.S.C. 154(b) by 212 days.

(21) Appl. No.: 17/974,503

(22) Filed: Oct. 26, 2022

Related U.S. Application Data

(60) Provisional application No. 63/271,777, filed on Oct. 26, 2021.

(51) Int. Cl.
  *G02B 6/38* (2006.01)
  *G02B 6/36* (2006.01)

(52) U.S. Cl.
  CPC ........... *G02B 6/3825* (2013.01); *G02B 6/366* (2013.01); *G02B 6/3897* (2013.01)

(58) Field of Classification Search
  CPC ..... G02B 6/366; G02B 6/3825; G02B 6/3897
  See application file for complete search history.

(56) References Cited

U.S. PATENT DOCUMENTS

| | | | |
|---|---|---|---|
| 7,428,363 B2 * | 9/2008 | Leon | G02B 6/4452 385/134 |
| 9,008,483 B2 * | 4/2015 | Larsson | G02B 6/4446 385/135 |
| 10,031,305 B2 * | 7/2018 | Leeman | G02B 6/4455 |
| 10,302,885 B2 * | 5/2019 | Morris | G02B 6/44524 |

FOREIGN PATENT DOCUMENTS

| | | | | |
|---|---|---|---|---|
| CN | 106133572 B | * | 11/2018 | .......... G02B 6/4455 |
| EP | 1639840 B1 | * | 1/2012 | .......... G02B 6/3849 |

* cited by examiner

*Primary Examiner* — Daniel Petkovsek
(74) *Attorney, Agent, or Firm* — Steven Ivy P.C.

(57) ABSTRACT

Disclosed is a fiber optic cable connectivity module comprising standardized fiber optic adapters that connect to various data management devices through fiber optic cables. The module facilitates remote event detection, circuitry tracing, monitoring of incoming signals, and tracking of network performance through the utilization of Internet of Things devices. This module features interchangeable access and carrier panels, with the former housing the fiber optic adapters and the latter housing power or data management devices. Inspection of the fiber optic cables can be conducted without removing the module from the multi-panel network rack by removing the access panel and pulling out the excess cables stored inside the module. Cable organizers within the module manage cable routing, ensuring separation of input and output cables, while also preventing excessive bending that could damage the fiber optic cables.

10 Claims, 13 Drawing Sheets

A PASSIVE AND ACTIVE FIBER CONNECTIVITY MODULE
COULD BE MOUNTED HORIZONTALLY
OR VERTICALLY (SHOWN ABOVE)
TO MULTI-PANEL NETWORK RACK

PASSIVE AND ACTIVE FIBER CONNECTIVITY MODULE

RELATED PATENT APPLICATION

The present U.S. Non-Provisional U.S. Patent Application claims priority under 35 U.S.C. § 119 (e) to U.S. Provisional Patent Application No. 63/271,777, Confirmation No. 7727, tiled MODULAR PASSIVE AND ACTIVE FIBER CONNECTIVITY MODULE, filed with the USPTO on Oct. 26, 2021, the subject matter of which is incorporated herein by reference.

FIELD OF THE INVENTION

The present invention addresses data networking and communications devices.

BACKGROUND OF THE INVENTION

The evolution of fiber optic networks requires ultra-high density fiber connectivity. To accommodate these requirements, the connectivity modules utilized with fiber optic networks have become quite large. Most commercially-available modules offer very limited event monitoring capabilities, and lack accessibility to the internal components, that may be responsible for diminishing bandwidth performance.

The above-defined shortcomings have made these modules increasingly difficult to troubleshoot. To compound the problem, they do not incorporate flexible, or interchangeable access panels, and provide no protection for delicate fiber optic cables populating the internal structure of said modules.

The present invention address the above-defined shortcomings of the commercially-available modules, by introducing a passive and active fiber connectivity module ("Connectivity Module Assembly"). The Connectivity Module Assembly offers customizable, and at the same time interchangeable access panels, providing an easy access to the module's internal fiber cables and other connectivity components.

The Connectivity Module Assembly occupies less rack space than its predecessors. It utilizes standard fiber optic adapters, without the need for any secondary coupling components.

The Connectivity Module Assembly simplifies the troubleshooting process with single circuit access, and flexible cable routing and slack management. Its ergonomic design facilitates packaging of optical components in one module, enabling coexistence of both wire and wireless networks densification.

The module's practical design make accessing the fiber optic cables quick and simple, without the need of removing the Connectivity Module Assembly from the multi-panel network rack. At the same time, the Connectivity Module Assembly is configured to house all functional components that are utilized by other, larges connectivity modules. These components allow for monitoring of the incoming signals, tracking of the power consumption, and the evaluation of the network performance via application of IOT plug-and-play modules, attached to the interchangeable carrier panel.

SUMMARY OF THE INVENTION

The following is intended to be a brief summary of the invention and is not intended to limit the scope of the invention:

The present invention discloses a passive and active fiber connectivity module ("Connectivity Module Assembly"). The Connectivity Module Assembly utilizes standardized fiber optic adapters, which via fiber optic cables are connected to various data management devices. The Connectivity Module Assembly provides efficient and flexible management of optical elements enabling uncompromised coexistence of fiber optic cables and wireless network components. The Connectivity Module Assembly incorporates interchangeable access panel (housing the fiber optic adapters) and carrier panel (housing power or data management devices). The fiber optic cable can be inspected, without removing the module from the multi-panel network rack, by removing access panel and pulling the excess cables stored inside the module. The access cable is managed by cable organizers. The cable organizers also manage the separation of input cables from the output cables, and prevent excessive, and thereby damaging, bending of the fiber optic cables. The module enables remote event detection, circuitry tracing, monitoring of incoming signals, and tracking of network performance via utilization of the internet of things devices. The Connectivity Module Assembly comprises of seven (7) primary components: (1) container base/U-shape (the primary substructure of the module); (2) plurality of fiber optic adapters (both input and output type, which may mounted in either vertical or horizontal orientation); (3) access panel (which holds the optic adapters and may be mounted to either end of the container base); (4) carrier panel (which holds power or data management devices, and may be mounted to either end of the container base); (5) power or data management devices (e.g. the internet of things devices, and various optical modules, such as eSFP or XFP); (6) first cable organizers and (7) and second cable organizer (both used for separating the input cable from the output cable, and for prevention of damaging banding of the cables, and for management of excess cable located inside the container base).

BRIEF DESCRIPTION OF THE DRAWINGS

The components shown in the drawings are not to scale. In the interest of clarity, some of the components might be shown in a generalized form and could be identified utilizing commercial designations. All components, including its essential features, have been assigned reference numbers that are utilized consistently throughout the descriptive process outlined herein.

FIGURE REFERENCE NUMBERS

100—Connectivity Module Assembly
  110—container base/U-shape
    111—mounting plate
    112—front end
    113—back end
    114—plurality of mounting holes
    115—hinge wall
    116—cover wall
    117—at least one hinge mount
    118—plurality of snap on grooves
    119—mounting flange
  120—plurality of fiber optic cables
    121—plurality of input fiber optic cables
    122—plurality of output fiber optic cables
  130—plurality of fiber optic adapters
    131—plurality of input fiber optic adapters
    132—plurality of output fiber optic adapters
  140—access panel
    141—input end
    142—output end
    143—two quick release flanges
    144—plurality of adapter holes
    145—two adapter rails
    146—retaining plate
  150—plurality of auxiliary connectors
  160—carrier panel
    161—mounting surface
    162—exterior wall
    163—two snap on pins
  170—power or data management devices
    171—power supply
    172—devices and internet of things devices
  180—first cable organizer
    181—first left dual-channel hub
      182—first cable channel
      183—second cable channel
      184—first left channel top
    185—first right dual-channel hub
      186—third cable channel
      187—fourth cable channel
      188—first right channel top
    189—first radius limiting hub
  190—second cable organizer
    191—second left dual-channel hub,
      192—fifth cable channel
      193—sixth cable channel
      194—second left channel top
    195—second right dual-channel hub,
      196—seventh cable channel
      197—eighth cable channel 198—second right channel top
199—second radius limiting hub
200—cover
201—hinge
210—multi-panel network rack

DETAILED DESCRIPTION OF THE PREFERRED EMBODIMENT

Figure 1:
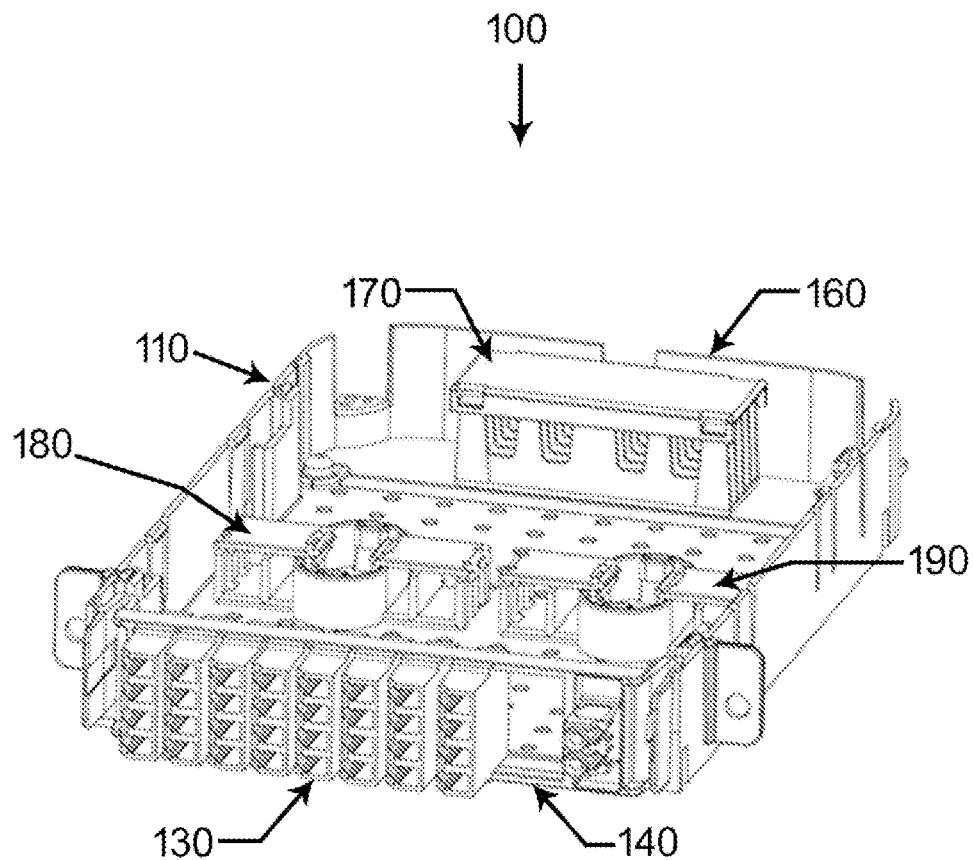
FIG. 1 is a perspective view of the passive and active fiber connectivity module ("Connectivity Module Assembly"), showing seven (7) primary components, namely: (1) container base/U-shape; (2) plurality of fiber optic adapters; (3) access panel; (4) carrier panel; (5) power or data management devices; (6) first cable organizer; (7) second cable organizer; in accordance with an exemplary embodiment of the present invention.
Figure 2:
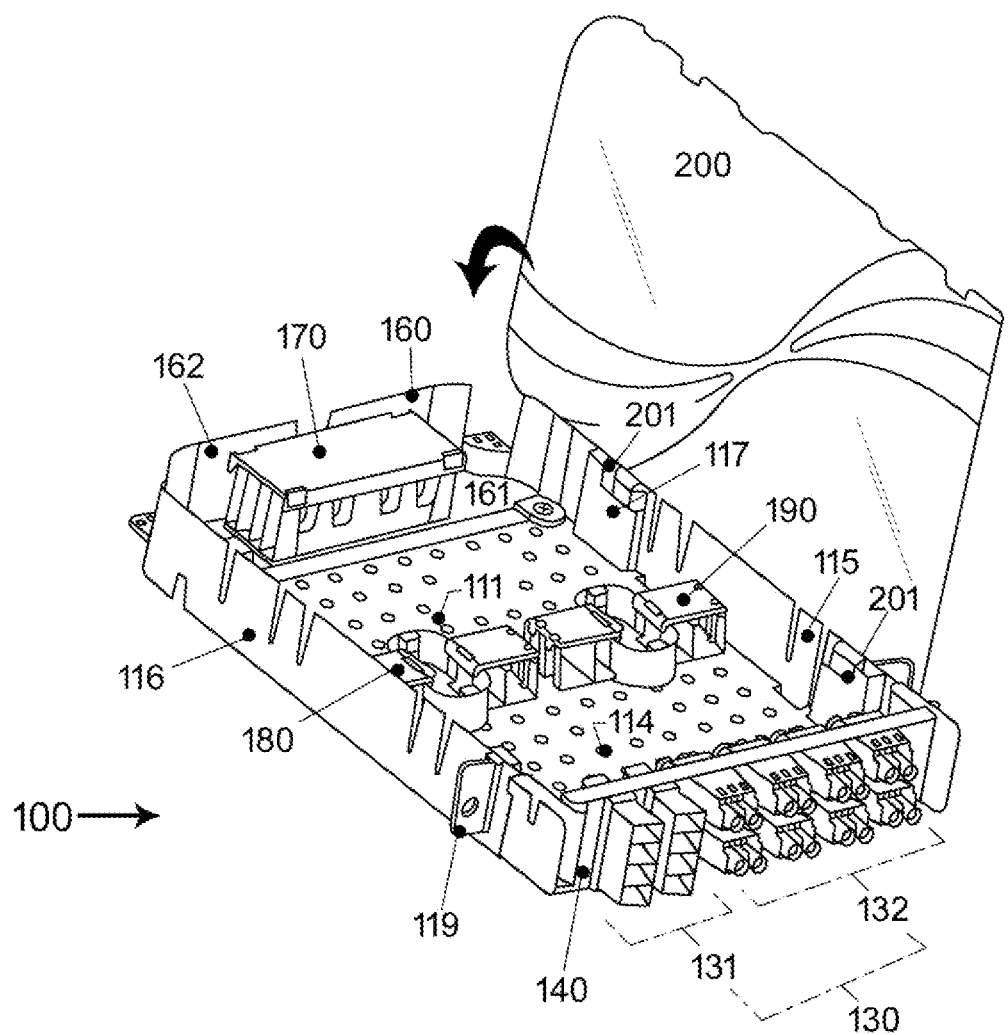
FIG. 2 is a perspective view of the Connectivity Module Assembly shown in open position, identifying various components of the assembly by using descriptive keys; in accordance with an exemplary embodiment of the present invention.

The following description references to the above-defined drawings and represents only an exemplary embodiment of the invention. It is foreseeable, and recognizable by those skilled in the art, that various modifications and/or substitutions to the invention could be implemented without departing from the scope and the character of the invention:

As depicted in FIGS. 1 and 2, the present invention introduces a passive and active fiber connectivity module referred to as the "Connectivity Module Assembly" 100. This device is engineered to accommodate commercially-available fiber optic adapters, along with networking devices featuring sensors, processing capabilities, and various software functionalities that facilitate connection and data exchange with other devices and systems via the internet, commonly known as the Internet of Things (IoT). In addition, the Connectivity Module Assembly 100 incorporates cable organizers 180 and 190 tailored to segregate and arrange input and output fiber optic cables 120, as shown in FIGS. 8-11. The cable organizers 180/190 include radius limiting features (i.e., radius limiting hubs 189 and 199) aimed at preventing excessive bending of the fiber optic cables 120, as shown in FIG. 11, a common cause of damage during cable inspections or maintenance.

As shown in FIGS. 1-4 and 8, the Connectivity Module Assembly 100 comprises of the following primary components: container base 110, plurality of fiber optic cables 120, plurality of fiber optic adapters 130, access panel 140, plurality of auxiliary connectors 150, carrier panel 160, power or data management devices 170, first cable organizer 180, second cable organizer 190, and cover 200.

Figure 3:
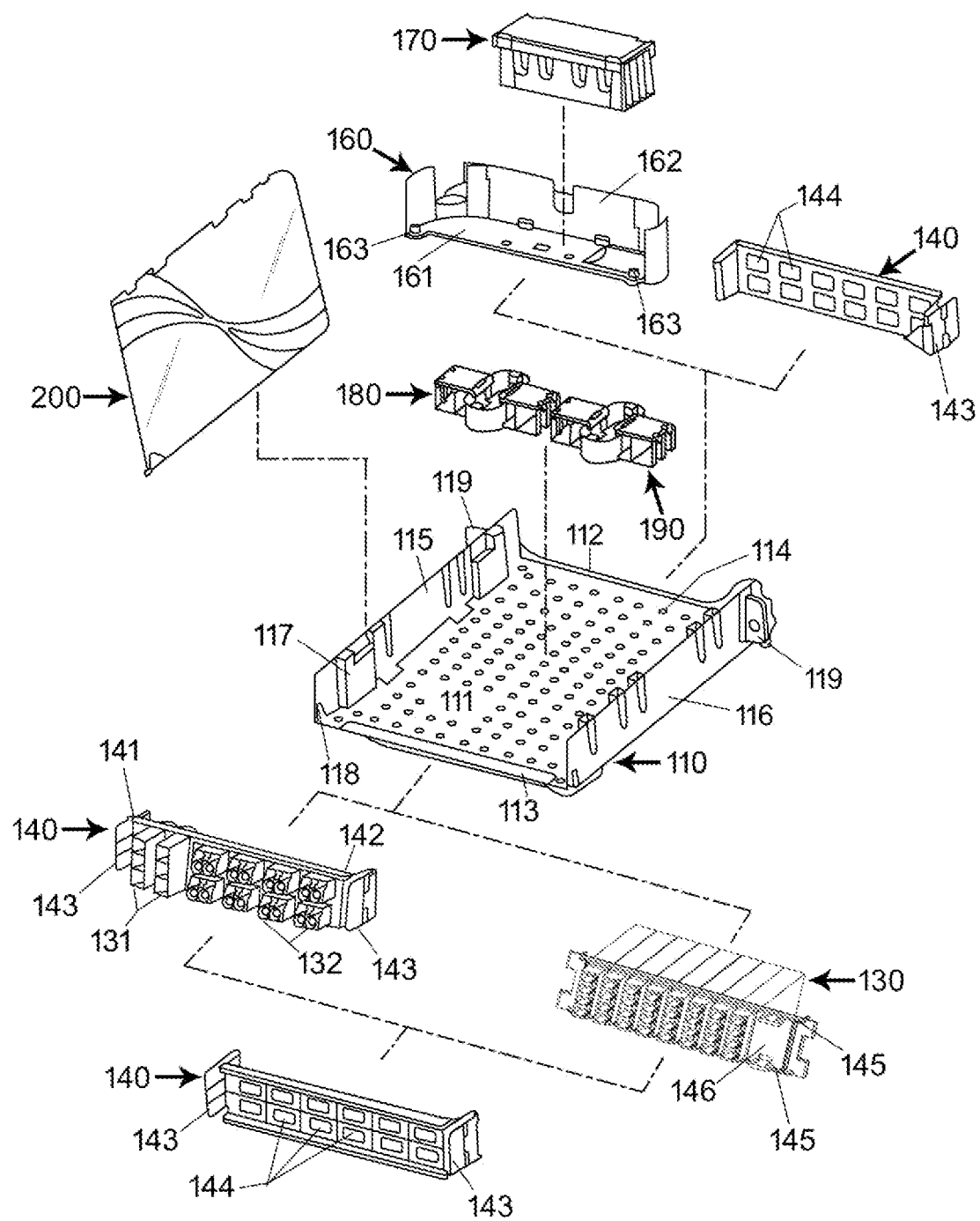
FIG. 3 is an exploded view of the Connectivity Module Assembly, identifying various components of the assembly, made to emphasize the order of assembly and relationship between interchangeable modules (access panel and carrier panel) of the Connectivity Module Assembly; in accordance with an exemplary embodiment of the present invention.
Figure 4:
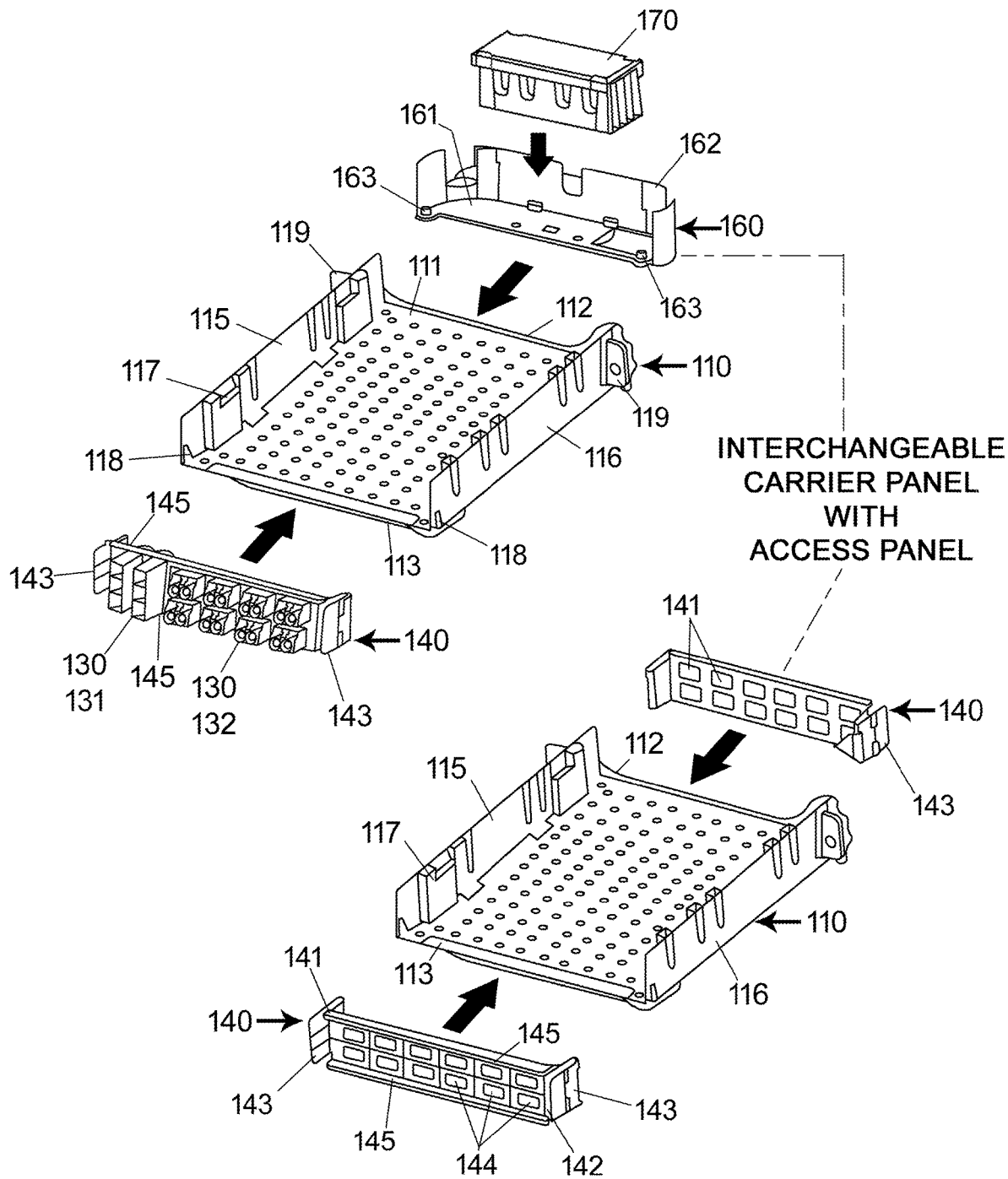
FIG. 4 is a view of two exploded Connectivity Module Assemblies, made to show the interchangeability between the access panel and the carrier panel, and to show the difference between the carrier panel with and without the plurality of fiber optic adapters; in accordance with an exemplary embodiment of the present invention.
Figure 13:
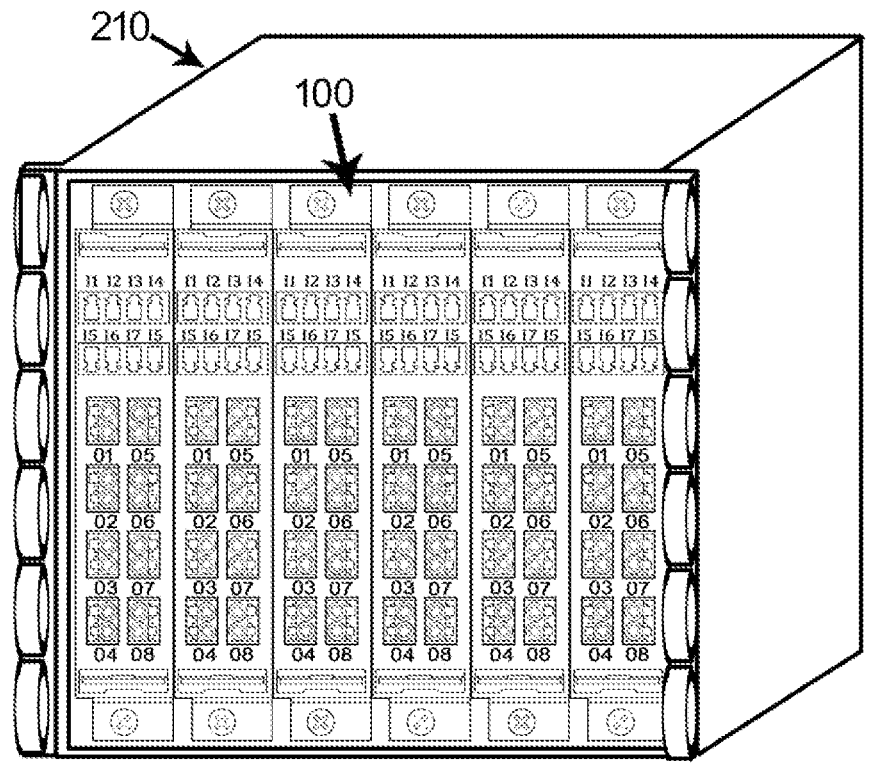
FIG. 13 shows a plurality of the Connectivity Module Assemblies (with its access panels populated with both red and green fiber optic adapters) mounted in a vertical orientation to the multi-panel network rack; in accordance with an exemplary embodiment of the present invention.

As shown in FIGS. 3 and 4, the container base 110 further comprises of a mounting plate 111, front end 112, back end 113, a plurality of mounting holes 114, hinge wall 115, cover wall 116, at least one hinge mount 117, plurality of snap-on grooves 118, and mounting flange 119. The mounting holes 114 are positioned on the mounting plate 111, serving a dual purpose. Firstly, they facilitate crucial airflow within the Connectivity Module Assembly 100, particularly around the IoT components prone to overheating during operational processes if adequate airflow is not provided. Secondly, if the Connectivity Module Assembly 100 is not installed within a multi-panel network rack 210 via the mounting flange 119 (as shown in FIG. 13), the mounting holes 114 can be used for attaching, via mounting screws, the Connectivity Module Assembly 100 to fixed surfaces.

As depicted in FIGS. 2-4, the mounting plate 111 is connected to both the hinge wall 115 and the cover wall 116. Specifically, the hinge wall 115 extends longitudinally between the front 112 and back 113 ends of the mounting plate 111, perpendicular to it. In contrast, the cover wall 116 is positioned opposite the hinge wall 115, longitudinally aligned with the mounting plate 111 in parallel to the hinge wall 115 and perpendicular to the mounting plate 111. Together, these three components—the mounting plate 111, hinge wall 115, and cover wall 116—form a U-shape, shown in FIG. 3, serving as the foundation to which all other components of the Connectivity Module Assembly 100 will be attached. Additionally, when a cover 200 is placed between the hinge wall 115 and cover wall 116, as shown in FIG. 2, it forms a fully enclosed unit designed to protect all the internal components.

As shown in FIGS. 3 and 4, the access panel 140 includes an input end 141, output end 142, two quick release flanges 143, a plurality of adapter holes 144, two adapter rails 145, and a retaining plate 146. One of the two quick release flanges 143 is situated on the input end 141, while the other is located on the output end 142 of the access panel 140. These quick release flanges 143 are used to manually attach or detach the access panel 140 from either the front 112 or the back 113 end of the container base 110.

The primary function of the access panel 140 is to hold the plurality of fiber optic adapters 130, shown in FIGS. 1-6. The plurality of fiber optic adapters 130 serve the important function of connecting two fiber optic connectors together. The plurality of fiber optic adapters 130 align the ferrules of the connectors precisely, ensuring minimal loss of signal during transmission. The plurality of fiber optic adapters 130 enable the seamless connection and high-speed transmission of data between the plurality of fiber optic cables 120.

The plurality of fiber optic adapters 130 are sub-divided into the plurality of input fiber optic adapters 131, and plurality of output fiber optic adapters 132, shown in FIGS. 2-4. The input fiber optic adapters 131 are designed to accept incoming fiber optic connectors used for processing; whereas the output fiber optic adapters 132 are designed to connect the internal optical components to external fiber optic cables, enabling transmission to external devices or networks.

Figure 7:
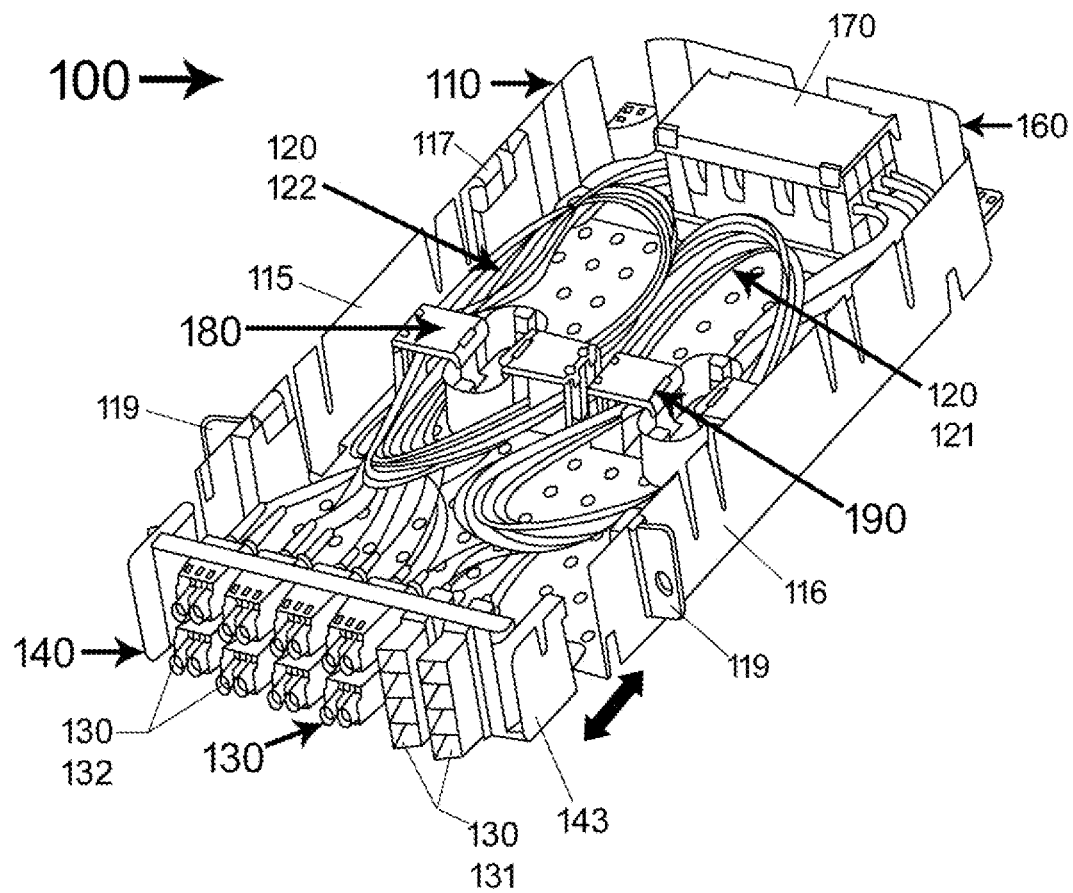
FIG. 7 is a perspective view of the Connectivity Module Assembly, showing the positioning of the plurality of fiber optic cables held and guided by the first cable organizer and the second cable organizer; wherein both cable organizers are mounted to the bottom plate of the container base; in accordance with an exemplary embodiment of the present invention.

Similarly to the fiber optic adapters 130, the plurality of fiber optic cables 120 is subdivided into a plurality of input fiber optic cables 121, and a plurality of output fiber optic cables 122, as shown in FIG. 7. The input fiber optic cables 121 are those through which signals are received or inputted into a device or system. They are connected to sources of data or signals, such as another device or a network, and serve to bring optical signals into the system. The output fiber optic cables 122 carry the optical signals generated within the device or system to external destinations such as other devices, networks, or endpoints.

Figure 5:
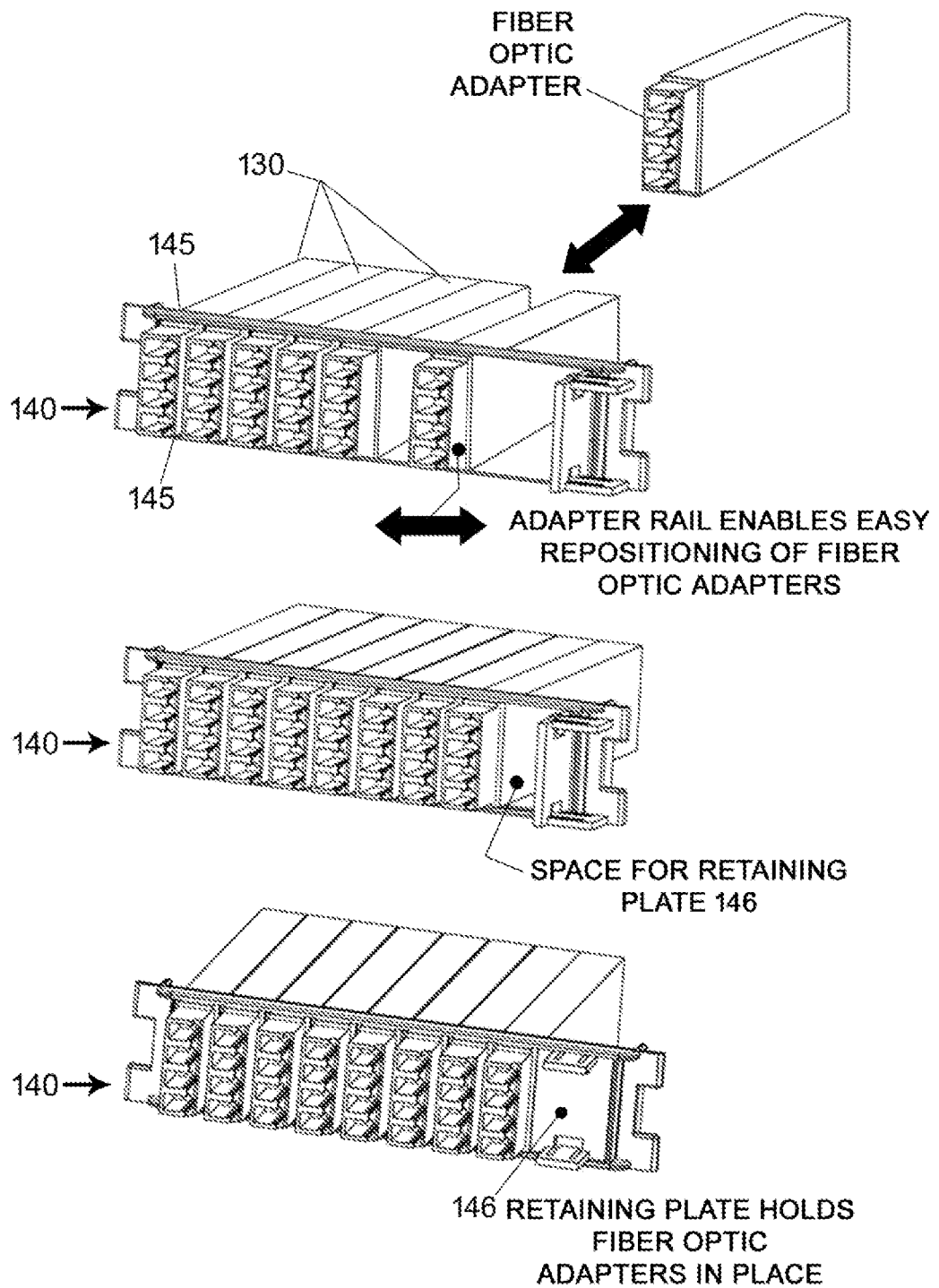
FIG. 5 is a perspective view of the access housing the plurality of fiber optic adapters, held in-between the two adapter rails, thereby enabling the lateral movement and desired repositioning of the said adapters; the view also shows how the retaining plate, positioned between the two adapter rails, covers the void created by the removed fiber optic adapters, keeping the remaining plurality of fiber optic adapters firmly in a desired location; in accordance with an exemplary embodiment of the present invention.

In order to accommodate a variety of shapes and sizes of commercially available fiber optic adapters, the design of the access panel 140 was specifically crafted to accommodate adapters of different configurations. As illustrated in FIGS. 3-5, the current invention showcases three distinct configurations: an open design utilizing a rail system, a closed layout featuring multiple pre-fabricated adapter holes, and a hybrid configuration that incorporates elements of both designs.

More specifically, the closed layout of the access panel 140 incorporates a plurality of adapter holes 144 configured to securely hold the plurality of fiber optic adapters 130, either in horizontal or vertical orientation. The open layout of the access panel 140 incorporates two adapter rails 145 positioned parallel to each other, designed to slideably hold the plurality of fiber optic adapters 130 in either horizontal or vertical orientation, as shown in FIG. 5. The hybrid configuration integrates both the plurality of adapter holes and the two adapter rails.

As depicted in FIG. 3, the access panel 140 containing either of these configurations may be attached to either the back end 113 or front end 112 of the container base 110. If attached to the front end 112 of the container base 110, it would replace the carrier panel 160, as shown in FIG. 3, allowing for different module configurations, most likely tailored to accommodate the specialized needs of the end-user.

As depicted in FIG. 5, the open configuration of the access panel 140, employing two adapter rails 145, is also engineered to accommodate a retaining plate 146. This retaining plate 146 serves as a placeholder for fiber optic adapter 130. Specifically, it is employed to secure or prevent the sliding of other fiber optic adapters onto open spaces formed when unused adapters are extracted.

Figure 6:
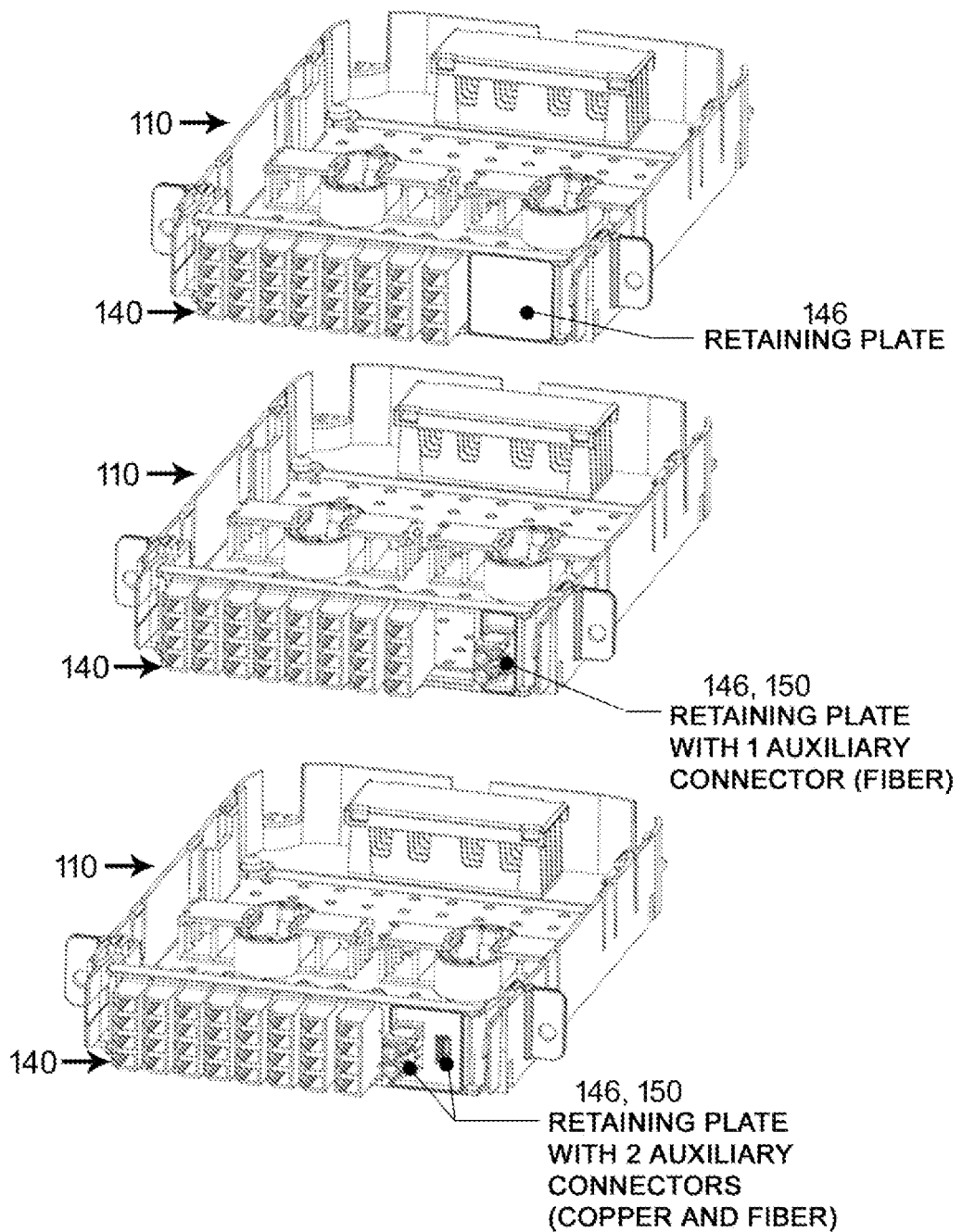
FIG. 6 shows three perspective views of the Connectivity Module Assemblies, designed to convey the adaptability of the retaining plate, held between the two adapter rails, wherein (1) the top view shows unpopulated retaining plate; (2) the middle view shows the retaining plate with 1 auxiliary connector (e.g. fiber); (3) the bottom view shows the retaining plate populated with 2 auxiliary connectors (e.g. copper and fiber); in accordance with an exemplary embodiment of the present invention.

As shown in FIG. 6, the retaining plate 146 may also be configured to house a plurality of auxiliary connectors 150. The plurality of auxiliary connectors 150 are receptacles designed to accept less common devices or enable connection via atypical means, such as copper wire. Which means that the auxiliary connectors 150 might serve purposes beyond the primary transmission of data, such as connecting to monitoring devices, testing equipment, or auxiliary power sources.

As shown in FIGS. 3 and 4, the carrier panel 160 is designed to hold power or data management devices 170. These devices play crucial roles in ensuring the efficient and reliable transmission of data, and they may include optical amplifiers, splitters, switches, transceivers, power supply 171, testing devices, and Internet of Things devices 172. The carrier panel 160 is releasably attached to the mounting plate 111. It comprises a mounting surface 161 (to which the above-defined devices are attached), an exterior wall 162, and two snap-on pins 163. The two snap on pins 163, located on the mounting surface 161, are configured to interact with the plurality of snap on grooves located on the mounting plate 111, enabling firm attachment of the carrier panel 160 to the container base 110. The exterior wall 162 is configured to enclose space between the hinge hall 115 and the cover wall 116, thereby protecting access to the power or data management devices 170 housed on the mounting surface of the carrier panel 160.

Figure 8:
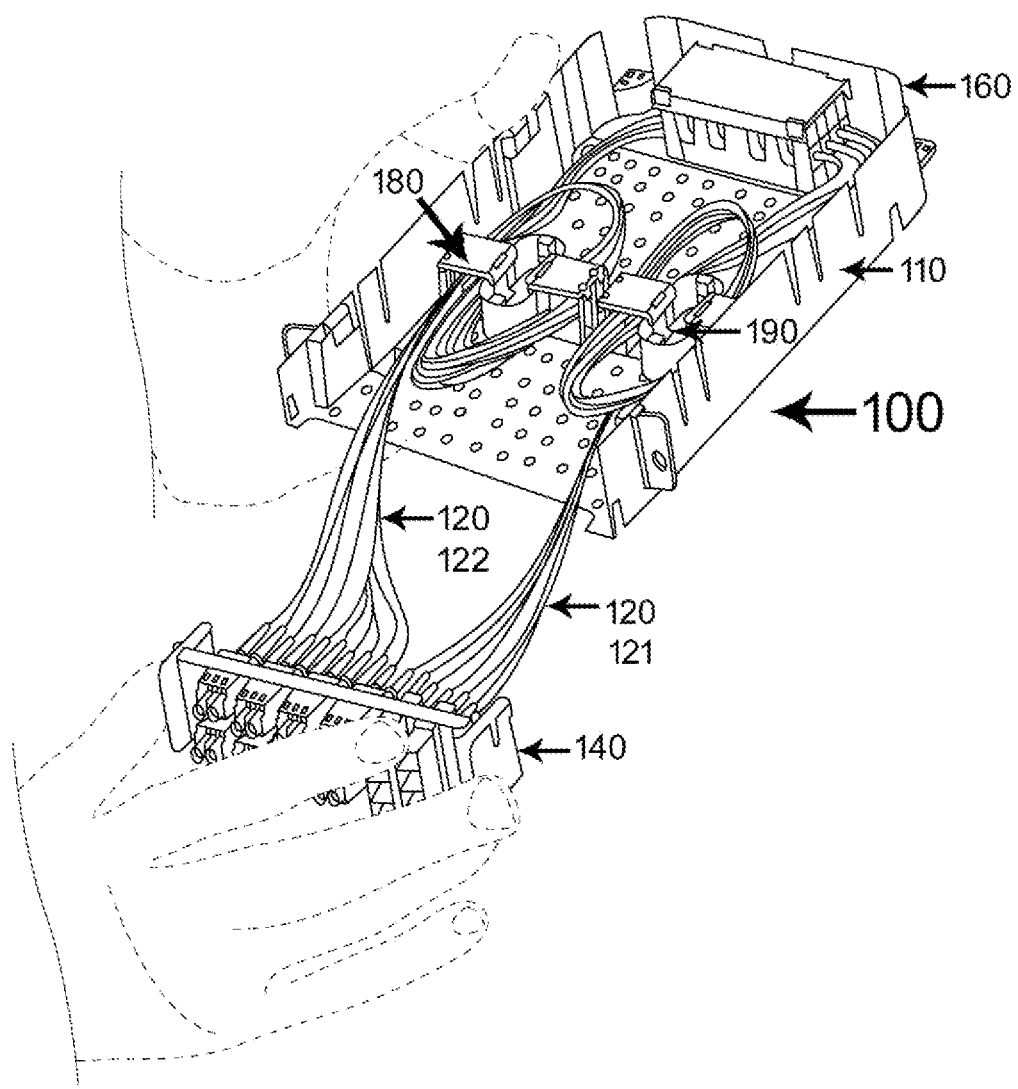
FIG. 8 is a perspective view of the Connectivity Module Assembly, showing the positioning of the plurality of fiber optic cables, guided by the first cable organizer and the second cable organizer, during the manual removal of the access panel by the end-user from the container base; in accordance with an exemplary embodiment of the present invention.

The easily detachable and interchangeable nature of the access panel 140 (housing the plurality of fiber optic adapters 130) and carrier panel 160 (housing power or data management devices) streamlines the inspection or maintenance of internal components within the Connectivity Module Assembly 100 without necessitating the removal of the module 100 from the multi-panel network rack 200. This convenience stems not only from the simple detachment of the access panel 140 but also from the capability to pull the access panel 140, along with all the plurality of fiber optic cables 120, away from the module assembly 100, as shown in FIG. 8. This provides access to the container base 110, housing various components, without risking damage to the delicate fiber optic cables 120 that may remain attached to the access panel 140.

The above-defined functionality is enabled by the cable organizers integrated within the Connectivity Module Assembly 100, shown in FIGS. 7-11. The Connectivity Module Assembly 100 can employ either one or two cable organizers depending on the specific network needs of the end-user. In this instance, for illustrative purposes, two cable organizers are utilized, designated as the first cable organizer 180 and the second cable organizer 190.

Figure 10:
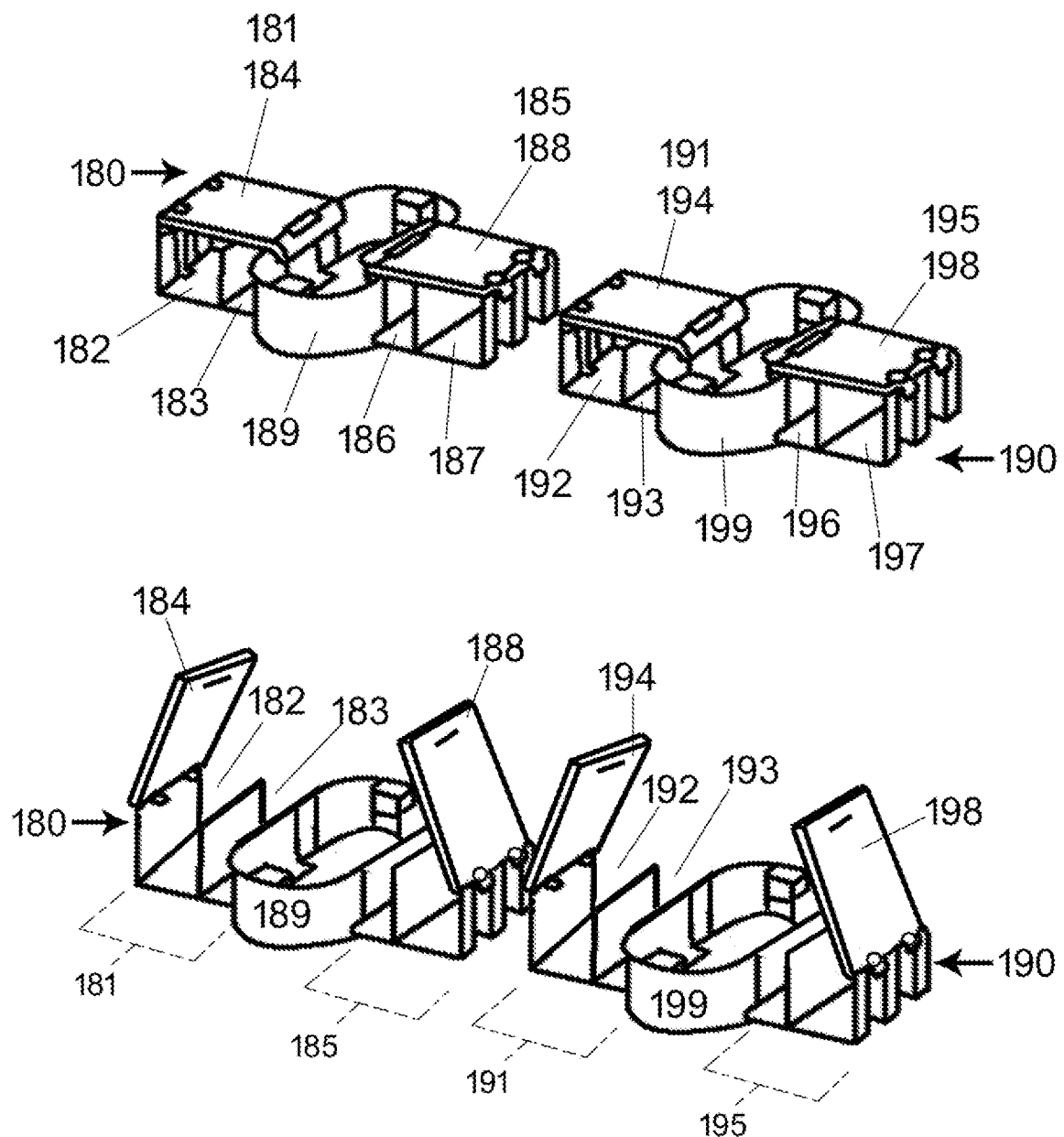
FIG. 10 is identifying various components of the first cable organizer and the second cable organizer by using leaders and descriptive keys; in accordance with an exemplary embodiment of the present invention.
Figure 11:
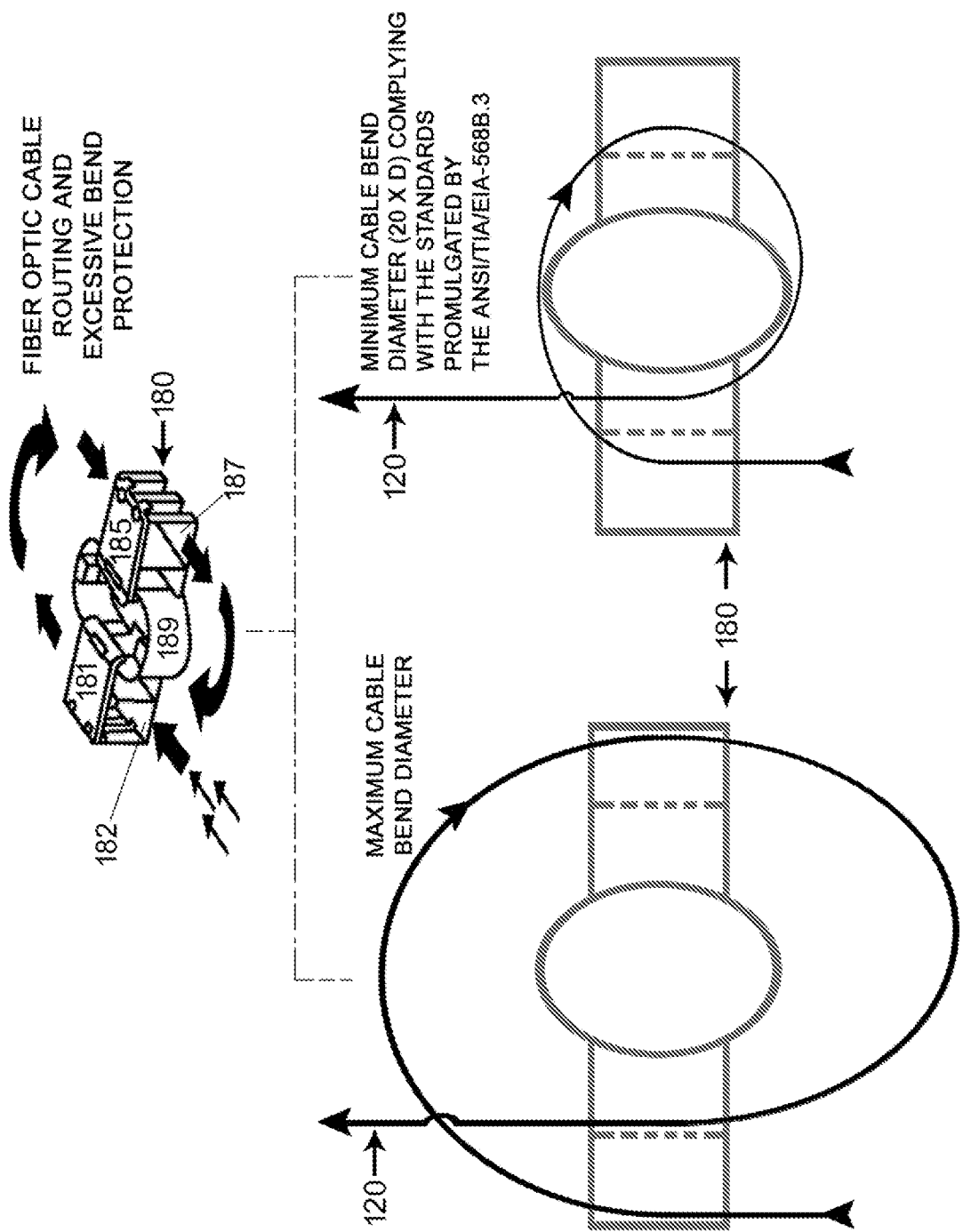
FIG. 11 shows three figures; the top figure illustrates the routing of the plurality of fiber optic cables through the first cable organizer; the lower left figure illustrates the maximum cable bend diameter when routed through first cable organizer; and the lower left figure illustrates the minimum cable bend diameter, (well within the recommended safety standards promulgated by the ANSI/TIA/EIA-568B.3) when routed through first cable organizer; in accordance with an exemplary embodiment of the present invention.
Figure 12:
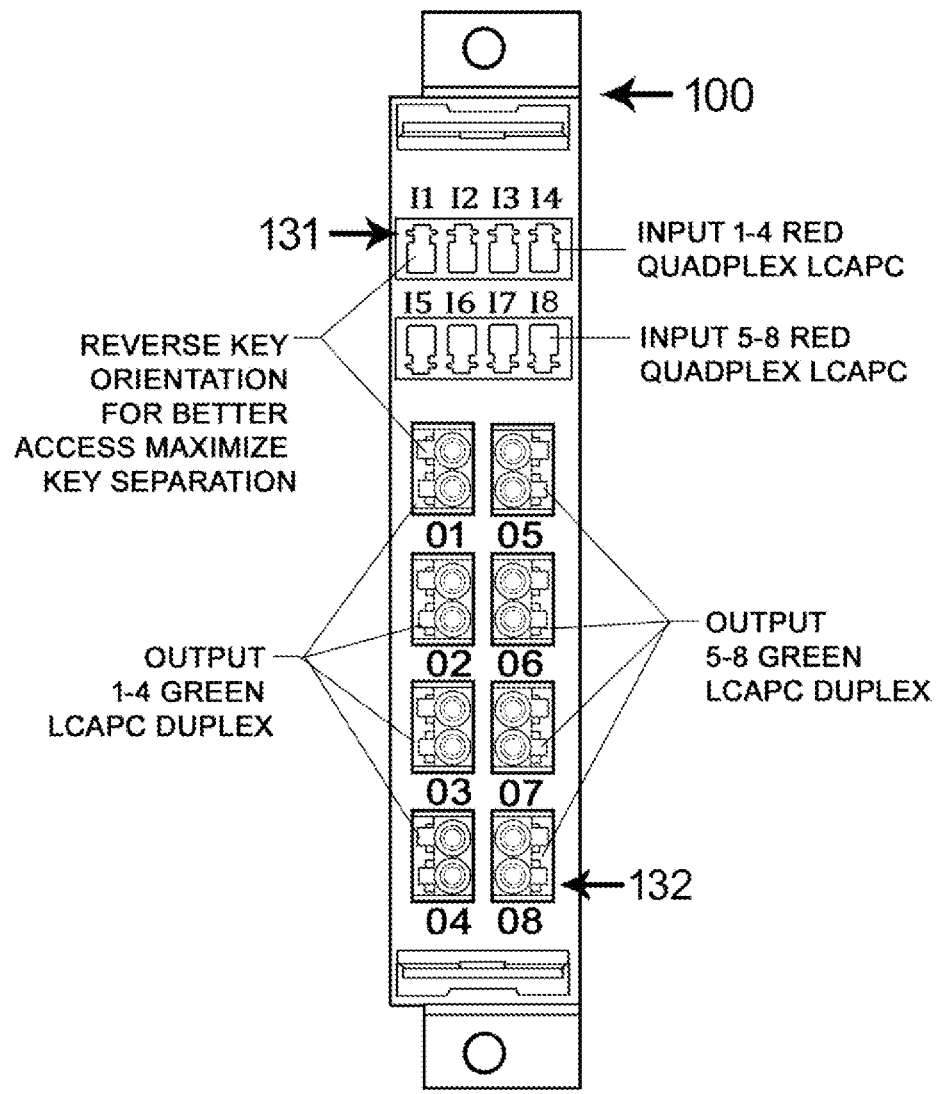
FIG. 12 shows the access panel populated with red (for input) and green (for output) fiber optic adapters, enabling separation of the input fiber optic cables from the output fiber optic cables; wherein the red fiber optic adapters are shown in horizontal orientation for better access and to maximize the key separation; and the green fiber optic adapters are shown in standard, vertical orientation; in accordance with an exemplary embodiment of the present invention.

As depicted in FIG. 10, the first cable organizer 180 comprises a first left dual-channel hub 181, featuring a first cable channel 182, a second cable channel 183, and a first left channel top 184. Acting as a lid (or hingeable cover), the first left channel top 184 ensures that the plurality of fiber optic cables 120 remain within the first left dual-channel hub 181 when being pulled or pushed during the inspection of the components attached to the container base 110. However, when manually opened, the first left channel top 184 permits the end-user to place or remove the plurality of fiber optic cables 120 from the first left dual-channel hub 181.

Figure 9:
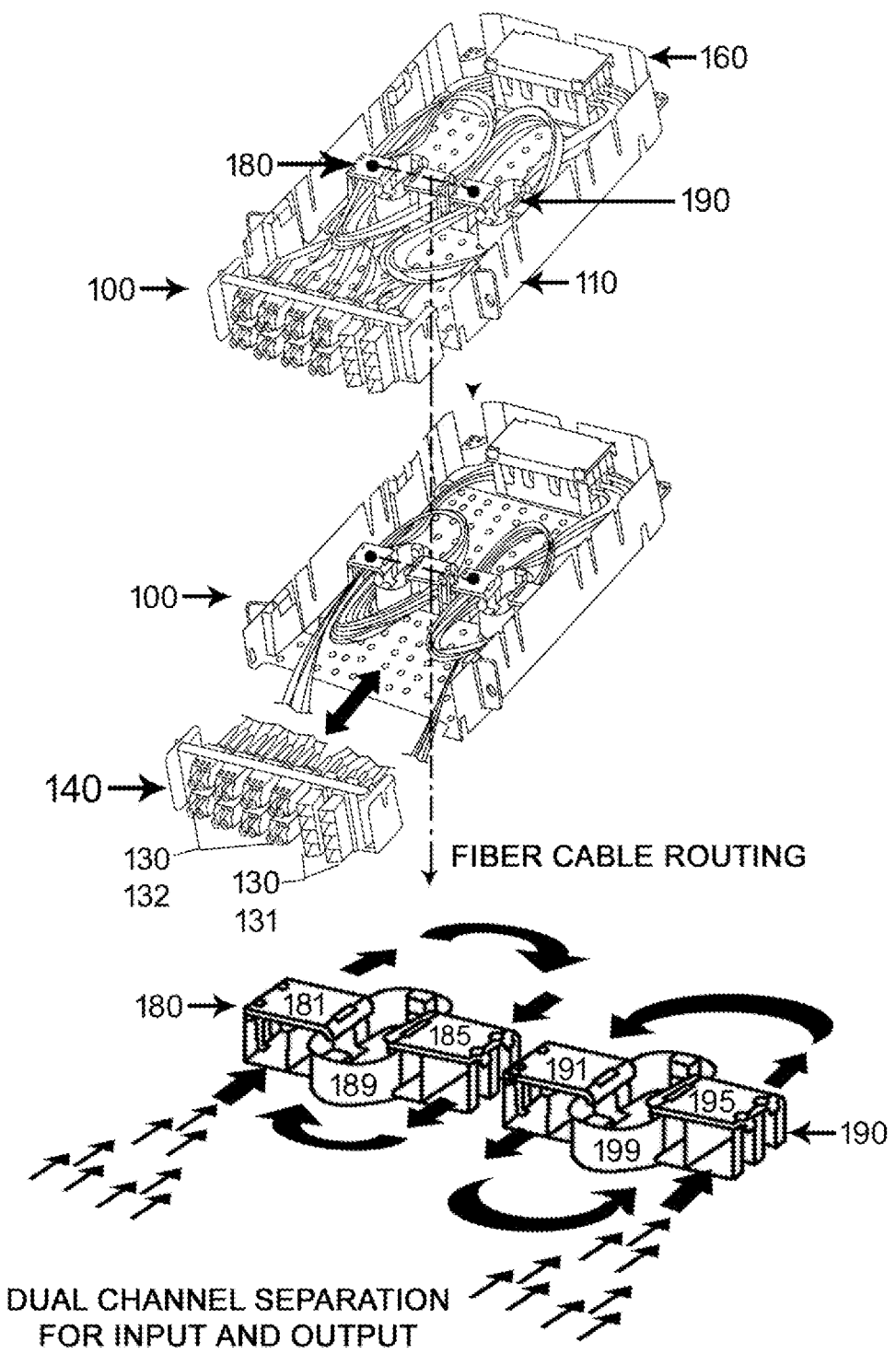
FIG. 9 shows the fiber optic cable routing figure within the first cable organizer and the second cable organizer, and two perspective views of the Connectivity Module Assemblies designed to illustrate the functionality of the dual channel separation (or the separation between input and output cables); the first perspective view shows the fiber optic cables fully contained in the container base; and the second perspective view shows the fiber optic cables partially retracted from the container base; the fiber optic cable routing figure shows how the fiber optic cables are arranged to form a dual channel separation; the same figure also shows the routing of the cables, which enables easy access to the cables by simply removing of the access panel; in accordance with an exemplary embodiment of the present invention.

As shown in FIGS. 9-11, adjacent to the first left dual-channel hub 181 is the first radius-limiting hub 189. The first radius-limiting hub 189 is sandwiched between the first left dual-channel hub 181 and the first right dual-channel hub 185. The first radius-limiting hub 189 is oval in shape and serves to prevent excessive bending of the plurality of fiber optic cables 120 when pulled or pushed beyond a predetermined diameter or bending limit.

The maximum bend limit for fiber optic cables depends on several factors, including the type of fiber, its diameter, and the manufacturer's specifications. However, a general guideline is that the minimum bend radius for most fiber optic cables should not be less than 10 times the cable diameter, or 10×D (for example, for a fiber optic cable with a diameter of 3 mm, the minimum bend radius should be at least 30 mm). Bending the cable beyond this limit can cause signal loss, attenuation, or even damage to the fiber, leading to performance issues or failure of the cable. For this reason, the first radius-limiting hub 189 may be set to 10×D or 20×D (as currently promulgated by the ANSI/TIA/EIA-568-B.3 standard), or any greater radius depending on the end-users' requirements.

As shown in FIG. 10, the first right dual-channel hub 185 comprises a third cable channel 186, a fourth cable channel 187, and a first right channel top 188. Similar to the first left channel top 184, the first right channel top 188 is designed to be opened and closed easily, allowing for the convenient placement or removal of the plurality of fiber optic cables 120. When closed, the top 188 ensures that the fiber optic cables 120 stay contained within the first right dual-channel hub 185, even when the access panel 140, to which the cables are attached, is pulled or pushed.

The second cable organizer mirrors the design of the first cable organizer. However, when two of these organizers are employed simultaneously, the cable channels of the second organizer are sequentially numbered for clarity. Hence, subsequent cable channels are sequentially labeled as the fifth, sixth, and so forth.

More specifically, a second cable organizer 190 is used for routing either the plurality of input fiber optic cables 121 or the plurality of output fiber optic cables 122, as shown in FIG. 8. It consists of a second left dual-channel hub 191, featuring a fifth cable channel 192, a sixth cable channel 193, and a second left channel top 194. This top 194 ensures that the plurality of fiber optic cables 120, attached to the to the fiber optic adapter 130 held by access panel 140, when pulled together remain within the second left dual-channel hub 191. The second left channel top 194 is designed to be releasably opened, allowing for the placement or removal of the plurality of fiber optic cables 120 from the second left dual-channel hub 191.

The second right dual-channel hub 195, located adjacent to the second left dual-channel hub 191, includes a seventh cable channel 196, an eighth cable channel 197, and a second right channel top 198. This top ensures that the plurality of fiber optic cables 120, when pulled or pushed, stay within the second right dual-channel hub 195. It is designed to be releasably opened, facilitating the placement or removal of the plurality of fiber optic cables 120 from the second right dual-channel hub 195.

Similar to the first radius limiting hub 189, the second radius limiting hub 199 is oval-shaped and serves the same purpose of preventing excessive bending of the plurality of fiber optic cables 120 when pulled or pushed beyond a predetermined diameter or bending limit, as shown in FIG. 11. The second radius limiting hub 199 is positioned between the second left dual-channel hub 191 and the second right dual-channel hub 195, as shown in FIG. 10.

As shown in FIGS. 7-9, the first cable organizer 180 and the second cable organizer 190 are attached to the mounting plate 111 of the container base 110. This is a strategic positioning specifically designed to separate the plurality of input fiber optic cables 121 from the plurality of output fiber optic cables 122.

Keeping input and output cables separate helps maintain signal integrity by reducing the risk of interference or crosstalk between them. This separation ensures that signals transmitted from input devices reach output devices without distortion. Separating input and output cables simplifies maintenance and troubleshooting processes. When issues arise, technicians can quickly identify and address problems without confusion, focusing on the relevant set of cables.

As shown in FIG. 9, when routing the plurality of fiber optic cables 120, connecting the plurality of fiber optic adapters 130 to the power or data management devices 170, through the first cable organizer 180, the fiber optic cables 120 follow this path: they are routed from the plurality of fiber optic adapters 130, through the first cable channel 182, around the first radius limiting hub 189, through the fourth cable channel 187, around the first radius limiting hub 189 again, through the second cable channel 183, and finally into the power or data management devices 170. And, the routing of the plurality of fiber optic cables 120 through the second cable organizer 190 follow this path: from the plurality of fiber optic adapters 130, through the fifth cable channel 192, around the second radius limiting hub 199, through the eighth cable channel 197, around the second radius limiting hub 199, through the sixth cable channel 193, and into the power or data management devices 170.

The power or data management devices 170, along with the plurality of fiber optic cables 120 are routed through both the first cable organizer 180 and the second cable organizer 190, are situated within the U-shaped area created by the hinge wall 115 and the cover wall 116, which are connected to the mounting plate 111, as shown in FIG. 7 This setup is safeguarded by a cover 200, attached via a hinge 201 (or plurality of hinges 201) to at least on hinge mount 117 located on the hinge wall.

The components outlined above, along with their customizable features, streamline the process of inspecting and repairing the Connectivity Module Assembly 100 while safeguarding the fiber optic cables 120. End-users can tailor the configuration of the Connectivity Module Assembly 100 by: (1) Attaching either the access panel 140 or the carrier panel 160 to either the front end 112 or the back end 113 of the container base 110; (2) Configuring the access panel 140 to segregate the plurality of input fiber optic adapters 131 from the plurality of output fiber optic adapters 132; (3) Setting up the access panel 140 to accommodate the plurality of fiber optic adapters 130 in either vertical or horizontal orientation; (4) Routing the plurality of input fiber optic cables 121 separately from the plurality of output fiber optic cables 122; (5) Accessing the plurality of fiber optic cables 120 without needing to open the cover 200 or remove the Connectivity Module Assembly 100 from the multi-panel network rack 210 by detaching and pulling out the access panel 140; (6) Employing cable organizers 180/190 to ensure minimal bending of the plurality of fiber optic cables 120, thus preventing damage, while leveraging the inherent rigidity of the cables to return them to their original position by pushing the access panel back into place.

We claim:
1. A passive and active fiber connectivity module, comprising:
   (A) a container base, having
     (a) a mounting plate;
     (b) a front end;
     (c) a back end;
     (d) a plurality of mounting holes disposed on said mounting plate;
     (e) a hinge wall, longitudinally disposed on the mounting plate between the front end and the back end, and in perpendicular position to the mounting plate;
     (f) a cover wall, disposed longitudinally on the mounting plate, in parallel position to the hinge wall, and perpendicular position to the mounting plate, configured to form together with the hinge wall and the mounting plate a U-shape;
   (B) a plurality of fiber optic cables for providing high-speed data transmission; wherein said plurality of fiber optic cables comprise
     (a) a plurality of input fiber optic cables; and
     (b) a plurality of output fiber optic cables;
   (C) a plurality of fiber optic adapters for providing connection to the plurality of fiber optic cables; wherein said plurality of fiber optic adapters comprise
     (a) a plurality of input fiber optic adapters; and
     (b) a plurality of output fiber optic adapters;
   (D) an access panel having
     (a) an input end;
     (b) an output end;
     (c) two quick release flanges; wherein one of the quick release flanges is located on the input end, and one of the quick release flanges is located on the output end; the two quick release flanges are configured to compressibly attach or detach the access panel from the front end of the container base, or to compressibly attach or detach the access panel from the back end of the container base;
     (d) a plurality of adapter holes configured to fixedly hold the plurality of fiber optic adapters;
     (e) wherein said plurality of adapter holes are configured to fixedly hold the plurality of fiber optic adapters either in horizontal orientation or in vertical orientation;
     (f) wherein said access panel includes a configuration selected from the group consisting of:
       (i) the plurality of adapter holes,
       (ii) two adapter rails positioned in parallel to each other and configured to slidably hold the plurality of fiber optic adapters in horizontal orientation,
       (iii) a combination of the plurality of adapter holes and the two adapter rails, and
       (iv) a retaining plate slidably held by the two adapter rails, configured to house a plurality of auxiliary connectors, wherein said retaining plate is configured to function with the plurality of fiber optic adapters;
   (E) a carrier panel, releasably attached to the mounting plate, having
     (a) a mounting surface, configured to house power or data management devices; and
     (b) an exterior wall, configured to enclose space between the hinge wall and the cover wall, thereby protecting access to the power or data management devices housed on the mounting surface of the carrier panel;

(F) a first cable organizer, for routing either the plurality of input fiber optic cables or the plurality of output fiber optic cables, comprising
  (a) a first left dual-channel hub, having a first cable channel, a second cable channel, and a first left channel top; wherein said first left channel top ensures that the plurality of fiber optic cables when pulled or pushed remains within the first left dual-channel hub; said first left channel top is configured to releasably open thereby allowing placement or removal of the plurality of fiber optic cables from the first left dual-channel hub;
  (b) a first right dual-channel hub, having a third cable channel, a fourth cable channel, and a first right channel top; wherein said first right channel top ensures that the plurality of fiber optic cables when pulled or pushed remains within the first right dual-channel hub; said first right channel top and is configured to releasably open thereby allowing placement or removal of the plurality of fiber optic cables from the first right dual-channel hub;
  (c) a first radius limiting hub, oval in shape, sandwiched between the second cable channel and the third cable channel; the first radius limiting hub is configured to prevent bending of the plurality of fiber optic cables when pulled or pushed beyond a predetermined diameter;

(G) a second cable organizer, for routing either the plurality of input fiber optic cables or the plurality of output fiber optic cables, comprising
  (a) a second left dual-channel hub, having a fifth cable channel, a sixth cable channel, and a second left channel top; wherein said second left channel top ensures that the plurality of fiber optic cables when pulled or pushed remains within the second left dual-channel hub; the second left channel top is configured to releasably open thereby allowing placement or removal of the plurality of fiber optic cables from the second left dual-channel hub;
  (b) a second right dual-channel hub, having a seventh cable channel, an eighth cable channel, and a second right channel top; wherein the second right channel top ensures that the plurality of fiber optic cables when pulled or pushed remains within the second right dual-channel hub; the second right channel top is configured to releasably open thereby allowing placement or removal of the plurality of fiber optic cables from the second right dual-channel hub;
  (c) a second radius limiting hub, oval in shape, sandwiched between the sixth cable channel and the seventh cable channel; the second radius limiting hub is configured to prevent bending of the plurality of fiber optic cables when pulled or pushed beyond a predetermined diameter;
  (d) wherein the first cable organizer and the second cable organizer are fixedly-disposed on the mounting plate and configured to separate the plurality of input fiber optic cables from the plurality of output fiber optic cables;
  (e) wherein the plurality of fiber optic cables for connecting the plurality of fiber optic adapters to the power or data management devices are routed through the first cable organizer from the plurality of fiber optic adapters, through the first cable channel, around the first radius limiting hub, through the fourth cable channel, around the first radius limiting hub, through the second cable channel, and into the power or data management devices;
  (f) wherein the plurality of fiber optic cables for connecting the plurality of fiber optic adapters to the power or data management devices are routed through the second cable organizer from the plurality of fiber optic adapters, through the fifth cable channel, around the second radius limiting hub, through the eighth cable channel, around the second radius limiting hub, through the sixth cable channel, and into the power or data management devices;

(H) a cover, having a hinge fixedly-mounted to the hinge wall, configured to releasably cover the U-shape, the access panel, and the carrier panel, thereby forming a fully enclosed container, made to protect the cable, and the power or data management devices housed on the mounting surface of the carrier panel; and (I) the passive and active fiber connectivity module is configured to releasably mount to a multi-panel network rack in either horizontal position or in vertical position;

whereby a user may customize the configuration of the fiber connectivity module by attaching the access panel or the carrier panel to either the front end or the back end of the container base, configuring the access panel to separate the plurality of input fiber optic adapters from the plurality of output fiber optic adapters, configuring the access panel to have the plurality of fiber optic adapters in either vertical or horizontal orientation, separating routing of the plurality of input fiber optic cables from routing of the plurality of output fiber optic cables, accessing the plurality of fiber optic cables without opening the cover or removing the fiber connectivity module from the multi-panel network rack by detaching and pulling out the access panel, using the rigid and springy structure of the plurality of fiber optic cables to ensure their protection by pushing the access panel back into place, enabling the plurality of fiber optic cables to return to their previous position.

2. A passive and active fiber connectivity module of claim 1 wherein:
said hinge wall further comprises of at least one hinge mount.

3. A passive and active fiber connectivity module of claim 2 wherein:
said hinge is configured to be fixedly-mounted to the hinge wall via the least one hinge mount.

4. A passive and active fiber connectivity module of claim 1 wherein:
said hinge wall and the cover wall further comprises a plurality of snap on grooves.

5. A passive and active fiber connectivity module of claim 4 wherein:
the two quick release flanges are configured to compressibly attach or detach the access panel from the front end of the container base, or to compressibly attach or detach the access panel from the back end of the container base via the plurality of snap on grooves.

6. A passive and active fiber connectivity module of claim 1 wherein:
said hinge wall and the cover wall comprises of a mounting flange.

7. A passive and active fiber connectivity module of claim 6 wherein:

the passive and active fiber connectivity module is configured to releasably mount to the multi-panel network rack via the mounting flange.

8. A passive and active fiber connectivity module of claim 1 wherein:
said carrier panel comprises two snap on pins.

9. A passive and active fiber connectivity module of claim 8 wherein:
said carrier panel is configured to releasably attached to the mounting plate via the two snap on pins.

10. A passive and active fiber connectivity module of claim 1 wherein:
said power or data management devices comprises of power supply devices and internet of things devices.

* * * * *